United States Patent
Hobraiche et al.

(10) Patent No.: US 7,923,960 B2
(45) Date of Patent: Apr. 12, 2011

(54) METHOD FOR CONTROLLING A POLYPHASE VOLTAGE INVERTER

(75) Inventors: Julien Hobraiche, Compiegne (FR); Jean-Paul Vilain, Melicocq (FR)

(73) Assignee: Valeo Equipements Electriques Moteur, Creteil (FR)

( * ) Notice: Subject to any disclaimer, the term of this patent is extended or adjusted under 35 U.S.C. 154(b) by 479 days.

(21) Appl. No.: 12/095,546

(22) PCT Filed: Dec. 5, 2006

(86) PCT No.: PCT/FR2006/051285
§ 371 (c)(1),
(2), (4) Date: Jul. 14, 2008

(87) PCT Pub. No.: WO2007/077372
PCT Pub. Date: Jul. 12, 2007

(65) Prior Publication Data
US 2010/0231145 A1    Sep. 16, 2010

(30) Foreign Application Priority Data
Dec. 22, 2005   (FR) ...................................... 05 13141

(51) Int. Cl.
*H02P 27/04* (2006.01)
(52) U.S. Cl. ........ 318/801; 318/800; 318/799; 318/798; 318/767

(58) Field of Classification Search .................. 318/801, 318/800, 799, 798, 767
See application file for complete search history.

(56) References Cited

U.S. PATENT DOCUMENTS

| 5,706,186 | A | 1/1998 | Blasko |
| 6,005,783 | A * | 12/1999 | Xue et al. ........................ 363/36 |
| 6,182,235 | B1 | 1/2001 | Ma et al. |
| 6,462,974 | B1 | 10/2002 | Jadric |
| 6,653,812 | B1 | 11/2003 | Huo et al. |
| 6,850,424 | B2 * | 2/2005 | Baudelot et al. ................ 363/37 |
| 2005/0029982 | A1 | 2/2005 | Stancu et al. |

FOREIGN PATENT DOCUMENTS
EP            0 911 950 A2     4/1999
* cited by examiner

*Primary Examiner* — Bentsu Ro
*Assistant Examiner* — David S Luo
(74) *Attorney, Agent, or Firm* — Berenato & White, LLC

(57) ABSTRACT

A method for driving a power bridge (1) which is used for controlling a multiphase electric load (3), is connectable to said electric load (3) through several arms and is drivable by switching functions determining control vectors for controlling the load, wherein said control vectors are subdivided into the free wheel control vectors and active control vectors. The inventive method is characterized in that it comprises the use of a switching function production method which produced a reduced number of switching function combinations corresponding to the free wheel control vectors for producing a sequence of the control vectors.

18 Claims, 5 Drawing Sheets

METHOD FOR CONTROLLING A POLYPHASE VOLTAGE INVERTER

CROSS-REFERENCE TO RELATED APPLICATIONS AND CLAIM TO PRIORITY

This application relates to International Application No. PCT/FR2006/051285 filed Dec. 5, 2006 and French Patent Application No. 0513141 filed Dec. 22, 2005, of which the disclosures are incorporated herein by reference and to which priority is claimed.

FIELD OF THE INVENTION

The invention concerns a method of controlling a power bridge intended to control an electrical load comprising several phases, the power bridge being intended to be connected to the electrical load via several arms, at least one per phase, and being intended to be controlled by switching functions, the said switching functions determining control vectors for controlling the load, the said control vectors being subdivided into freewheeling control vectors and active control vectors.

The present invention finds particularly advantageous, but not exclusive, applications in the fields of the automobile sector, the aeronautic sector and the industrial sector.

One aim of the invention is to reduce losses in a polyphase voltage inverter.

Another aim of the invention is to keep control over the polyphase load downstream of the inverter while reducing the switching losses of the inverter.

It also concerns a device implementing the said method of controlling a polyphase voltage inverter.

PRIOR ART

Generally, a polyphase voltage power bridge is used for driving a polyphase electrical load. These electrical loads are for example reversible machines such as alternator starters. The bridge is connected upstream to a DC supply source and connected downstream to the phase windings of the polyphase load. The power bridge is supplied with energy by the DC supply source in motor mode and by the alternator starter in alternator mode.

The power bridge comprises several bridge arms each comprising, for example, two switches provided with freewheeling diodes. This type of bridge is a dual-level bridge. The mid-point of each pair of switches of the same bridge arm is connected to a phase winding of the load. The control logic makes it possible to control the switches of one and the same bridge arm.

Currently, it is possible to generate several combinations of the switches of the bridge arms, with which it is possible to associate a vectorial representation of the output voltages of the inverter, which will be called power bridge control vectors. These control vectors are composed of active vectors and freewheeling vectors.

In the prior art, various types of techniques for controlling a polyphase inverter are known, among which there are found the document "A M Hava, R Kerkman, and T A Lipo. *A high performance generalised discontinuous pwm algorithm.* IEEE Trans. on Industry Applications, Vol 34 (No 5), September/October 1998". This document describes control techniques that use in particular discontinuous pulse width modulation strategies, controlling on the one hand the downstream part of the power bridge and on the other hand the bridge itself.

These control techniques inhibit alternately one of the bridge arms of the power bridge. For this purpose, according to the pulse width modulation strategy employed, a quantity of neutral is determined for each voltage-current phase difference of a phase of the load. For each phase of the load, a modulant is determined and translated by adding a quantity of neutral. With these control techniques, a bridge arm is inhibited when its modulant is saturated at +1 or −1.

Such control techniques have drawbacks. This is because it is not possible to determine the quantity of neutral to be added to the modulants when the system is not in permanent mode. In addition, in permanent mode, this quantity of neutral is either calculated in line, which requires a fairly long calculation time, or tabulated, which gives rise to a large consumption of memory.

In addition, for these control techniques of the prior art cited, knowledge of the voltage-current phase difference of the polyphase load is necessary. However, calculating or measuring this phase difference is very complex to do.

Likewise, the numerical implantation of these techniques poses problems with implementation. This is because, during their implantation, it is necessary to take account firstly of the many functioning points of the polyphase load (for example, motor, alternator, starter at different speeds and torque of an alternator starter) in order to apply a corresponding optimum quantity of neutral; and on the other hand different strategies corresponding to each quantity of neutral applied. The algorithm for effecting the numerical implantation is thus long and tedious to use.

DISCLOSURE OF THE INVENTION

The aim of the invention is precisely to remedy the drawbacks of the techniques disclosed above. For this purpose, the invention proposes novel control technique approaches naturally adapting to functioning in discrete time on a microprocessor. With these novel approaches, the two arms of the bridge to be switched are known immediately and optimally, by order relationships between modulants of each phase of the load. These modulants are determined from phase set values. The inhibited bridge arm is the one whose current is the highest in absolute value, as far as possible.

The inhibited bridge arm can also be determined by the position of the voltage vector in the stator reference frame. The quantity of neutral to be added to the modulants stems either from the comparison of the absolute values of the currents or from the position of the instruction voltage vector. These novel control technique approaches can be used either in permanent mode or in dynamic mode. In addition, with these novel control technique approaches, it is no longer necessary to measure the voltage-current phase difference.

More precisely, the method controls a power bridge intended to control an electrical load comprising several phases. The power bridge is intended to be connected to the electrical load via several arms, at least one per phase, and is intended to be controlled by switching functions, the said switching functions determining control vectors for controlling the load, the said control vectors being subdivided into freewheeling control vectors and active control vectors. The method comprises the application of a method of producing switching functions that produces a reduced number of combinations of switching functions corresponding to freewheeling control vectors in order to produce a succession of control vectors.

In accordance with the invention, the said method of producing switching functions comprises a step of selecting at least two bridge arms able to be inhibited as a function of an order relationship and a blocking step, throughout a period of chopping the power bridge, of one of the said at least two bridge arms able to be inhibited.

Thus the method makes it possible in fact to inhibit a bridge arm in a given state and therefore to reduce the switching losses caused in it if it had been caused to switch during the chopping period. The method allows the choice between two arms of the bridge to be inhibited. By choosing, in certain zones, the lockable bridge arm in which the current is maximum in absolute value, an optimum choice is made making it possible to have a maximum gain in terms of switching losses. According to non-limitative embodiments, the method according to the invention comprises the following supplementary characteristics taken in isolation or in combination:

- The method of producing switching functions comprises a step of determining a modulant associated with each arm of the bridge from scalar voltage set values.
- The determination of a modulant is made according to an intersective strategy. Thus the calculation of the modulants by a strategy of the intersective type is the most natural since there is then a simple relationship, easy to achieve on a signal processor.
- The determination of a modulant is effected according to a barycentric strategy. Many current variators already calculate the modulants in this way. It is then possible to naturally and rapidly adapt the method to what exists in the existing control logic.
- The order relationship is a comparison between the modulants associated with the bridge arms.
- The bridge arms selected correspond to the bridge arms having the largest modulant and the smallest modulant.
- The bridge arm to be inhibited is chosen from amongst the bridge arms selected and is the one that comprises a phase current that is highest in absolute value among the phase currents corresponding respectively to a larger of the modulants and a smaller of the modulants among the modulants associated with the bridge arm. Thus the establishment of an order relationship between the modulants and the comparisons of current in absolute are elementary calculations simple to implement on a signal processor. They make it possible in fact to determine with exactitude the optimum bridge arm to be inhibited in order to save on the maximum switching losses.
- If the bridge arm to be inhibited is the one corresponding to the largest of the modulants, then the bridge arm is inhibited in the high state, and it the bridge arm to be inhibited is the one corresponding to the smallest of the modulants, then the bridge arm is inhibited at the low state.
- The method of producing switching functions also comprises a step of determining a quantity of neutral to be added to a modulant according to a high state or low state of a bridge arm to be inhibited.
- Thus,
  - if an arm is to be inhibited at the high state then the quantity of neutral is equal to a first maximum value minus the modulant associated with the said arm, and
  - if the arm is to be inhibited in the low state then the quantity of neutral is equal to a second minimum value minus the modulant associated with the said arm.
- The method of producing switching functions comprises a step of comparing translated modulants of a quantity of neutral with a simple carrier, a modulant being associated with each bridge arm, the said comparison defining switching functions for controlling the said bridge. Thus a method of comparing translated modulants with a carrier makes it possible to define easily and rapidly the change in the switching functions that will control the inverter. This is also a method than can be used on signal processors dedicated to electrical machine control. In addition, the simple carrier is simple to implement and in general it is present natively in the dedicated electrical machine control processors.
- The simple carrier is an isosceles triangle comprising a vertex situated at a maximum value and a base situated at a minimum value. Thus a waveform of the isosceles triangle carrier type guarantees the centering of the control pulses around the chopping half-period, which is known to reduce the level of harmonic distortion of the phase currents in the load.
- The step of inhibiting a bridge arm depends on the position of a reference voltage vector in a domain of the plane determined by control vectors, the set value voltage vector ($\vec{V^*}$) being determined from scalar voltage set values.
- The domain of the plane is defined in a stator reference frame, the said stator reference frame being subdivided into angular sectors and the step of inhibiting a bridge arm in a high state or a low state depends on the position of the set value voltage vector in one of the angular sectors.
- Thus
  - if the set value voltage vector is in a first angular sector then the first arm is inhibited at the high state,
  - if the set value voltage vector is in a second angular sector then the third arm is inhibited at the low state,
  - if the set value voltage vector is in a third angular sector then the second arm is inhibited at the high state,
  - if the set value voltage vector is in a fourth angular sector then the first arm is inhibited at the low state,
  - if the set value voltage vector is in a fifth angular sector then the third arm is inhibited at the high state,
  - if the set value voltage vector is in a sixth angular sector then the second arm is inhibited at the low state.
- The step of inhibiting a bridge arm depends on a current vector.

According to another aspect, the invention also concerns a device for controlling a power bridge intended to be connected to an electrical load via a bus for implementing the method briefly described above. In accordance with the invention, the device comprises a control logic, the power bridge being intended to be connected to a control logic, the control logic implementing the said method.

According to yet another aspect, the invention also concerns a rotary electrical machine comprising:
- a multiphase electrical load,
- a voltage source,
- a power bridge intended to be connected downstream to the electrical load via a bus and upstream to the voltage source,
- a decoupling capacitor being disposed in parallel to the bus, and
- a device for controlling the power bridge as briefly described above.

BRIEF DESCRIPTION OF THE DRAWINGS

The invention will be understood better from a reading of the following description and an examination of the figures that accompany it. These are presented by way of indication and are in no way limitative of the invention. The figures show.

DETAILED DESCRIPTION OF EMBODIMENTS OF THE INVENTION

Figure 1A:
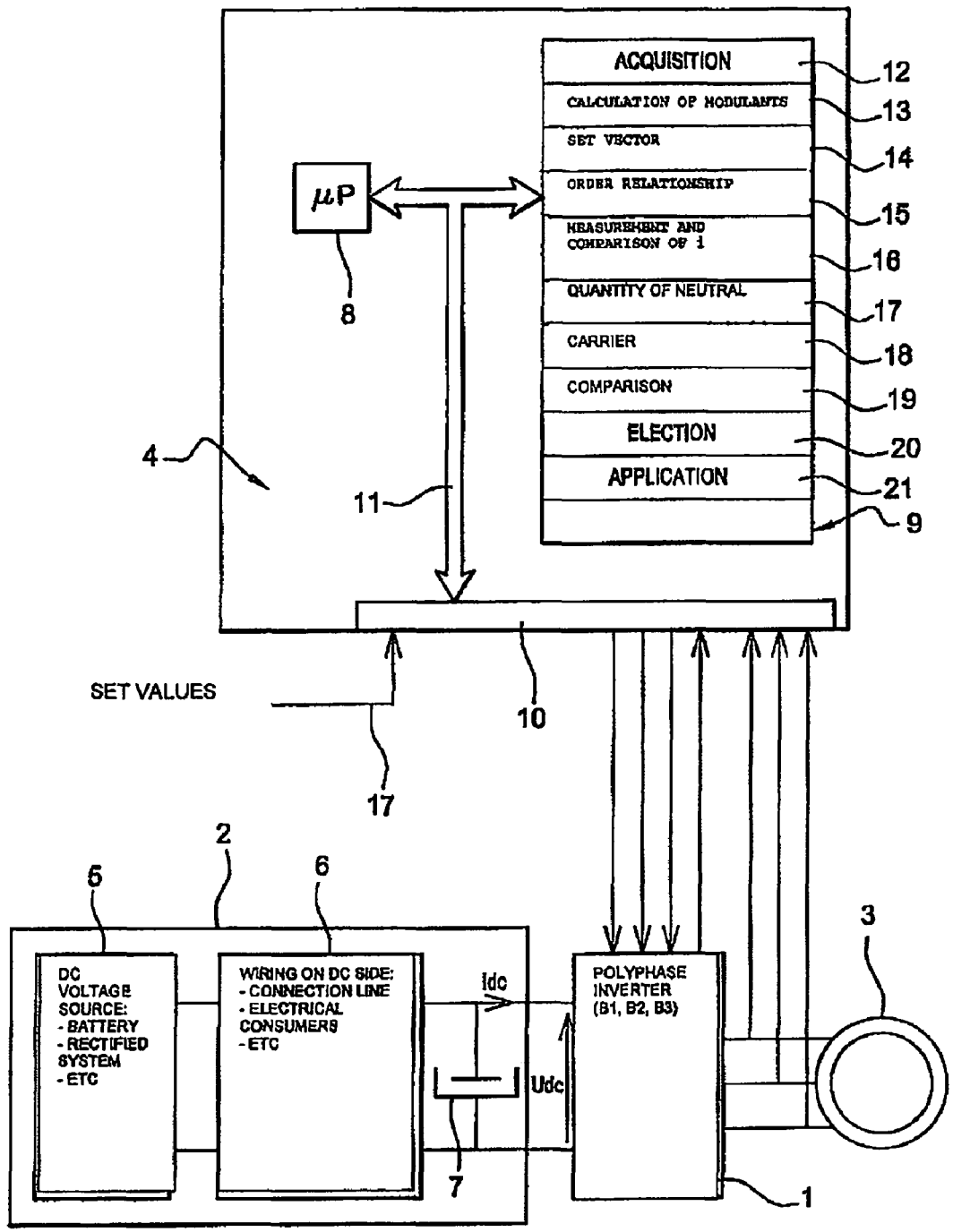
FIG. 1a: an illustration of means implementing the method, according to the invention.

FIG. 1A shows a polyphase power bridge 1 connected upstream to a DC bus 2, downstream to a polyphase load 3 and controlled by control vectors produced by a control logic 4. The power bridge 1 is an electrical device that is intended to convert a DC voltage into several sinusoidal voltages, one per phase when the associated load is functioning in motor mode. It is then called an inverter. In alternator (generator) mode the power bridge converts sinusoidal phase voltages into DC voltage in order to supply a consumer such as a battery. It is then called a controlled bridge rectifier.

The power bridge 1 comprises several bridge arms (not shown). Each bridge arm consists of several switches INT controllable electronically.

In other words, the converter is a DC to AC converter. On the AC side a polyphase load is placed. On the DC side there is the DC bus. It is necessary to supply energy to the polyphase load, it must come from the DC bus (motor mode). In alternator mode, it is the polyphase load that supplies energy to the DC bus. The polyphase load is therefore a reversible energy source, one characteristic of which is a DC voltage at its terminals.

For the remainder of the description, a dual-level three-phase power bridge will be taken as a non-limitative example, knowing that it can be replaced by other types of existing power bridge such as, in one non-limitative example, a three-level three-phase inverter, this then having three freewheeling vectors available.

In the remainder of the description, the case is adopted where the power bridge is an inverter. Naturally everything described in the remainder of the description for the inverter can also apply to a bridge rectifier except for the difference between an inverter and a bridge rectifier that has just been mentioned previously.

The inverter 1 is then a three-phase inverter controlling the load 3. It therefore comprises three bridge arms B1, B2 and B3. Each bridge arm comprises in a non-limitative example two bidirectional currents switches INT provided with freewheeling diodes. For example, the first arm comprise the high INT11 and low INT12 switches, the second arm the high INT21 and low INT 22 switches and the third arm the high INT31 and low INT32 switches.

The DC bus 2 comprises a DC voltage source 5. This DC voltage source 5 is, in a preferred example, a battery or rectified system. This voltage source 5 supplies the inverter 1. In the example in FIG. 1a, devices 6 that are in particular connection lines and/or electrical consumers are connected in series and/or in parallel to the voltage source 5. These electrical consumers can be, amongst other things, in the case of a motor vehicle, headlights, a radio, air conditioning, the list is not exhaustive.

The DC bus 2 also comprises a decoupling capacitor 7 connected in parallel to the voltage source 5. This capacitor 7 is preferably situated as close as possible to the inverter 1. This reduces the line inductance between the capacitor and the switches. In this way, increasing the overvoltages at the time of switching of the switches and therefore breaking the said switches is avoided.

The current in the capacitor 7 represents the undulatory part of the current source. The role of the capacitor 7 is to filter the source current entering the inverter 1. This enables the voltage source 5 to deliver only the mean value of the said source current to the inverter 1.

The load 3 can in non-limitative examples be an asynchronous, synchronous etc motor. The mid-point of each pair of switches on the same bridge of the inverter 1 is connected to a phase of the load 3.

As will be seen in detail below, the inverter 1 is controlled in pulse width modulation (normally referred to as PWM in English "Pulse Width Modulation"), by the control logic 4. This type of control makes it possible to have a voltage supply at variable frequency and variable voltage level. It is therefore possible to adapt, for each particular operating condition of the electrical load (for example, if in alternator mode, it is necessary to supply a certain power for supplying consumers, a voltage vector of given norm and turning at a given speed will be required), the value of the currents in the load as well as their frequencies. Consequently PWM control makes it possible to control the load precisely.

To control a polyphase inverter, the control logic 4 defines the open or closed state of all the switches of the inverter 1. Non-limitatively, the control logic 4 makes it possible to control the switches of one and the same bridge arm in a complementary manner. This makes it possible to avoid putting the supply source in short-circuit.

The opposing control of the switches on one and the same bridge and the finite number of switches means that the number of possible configurations of the switches of the bridge arms is finite.

For the dual-level three-phase inverter 1, it is possible to generate 8 different configurations of the switches of the bridge arms. With each of these 8 configurations, it is possible to associate a vectorial representation of the output voltages of the inverter, which will be termed inverter control vectors. These control vectors are commonly referred to as output vectors of the inverter.

The control vector is a mathematical representation that represents the resultant of the actual voltages applied to the load 3. Among these configurations, six are active states $\vec{V1}$ to $\vec{V6}$ corresponding to a fixed control vector amplitude and are distinguished by the phase, and two $\vec{V0}$ and $\vec{V7}$ are so called "freewheeling" states for which the amplitude of the control vector is zero and its phase ($\Phi$=arc tangent y/x) is not defined. It should be noted that the phase of the active vectors is defined as being the angle oriented between the alpha axis of a stator reference frame (defined in detail below) and the corresponding active vector. Thus, for $\vec{V1}$, the phase is equal to 0, the phase of $\vec{V2}$ is equal to 60°, etc.

In a non-limitative embodiment, a control vector produced by the control logic 4 comprises as many switching functions SC as the load 3 has phases. In the case of the example taken of a dual-level three-phase inverter, controlled in complementary mode, there are three switching functions SC for a control vector.

Figure 1B:
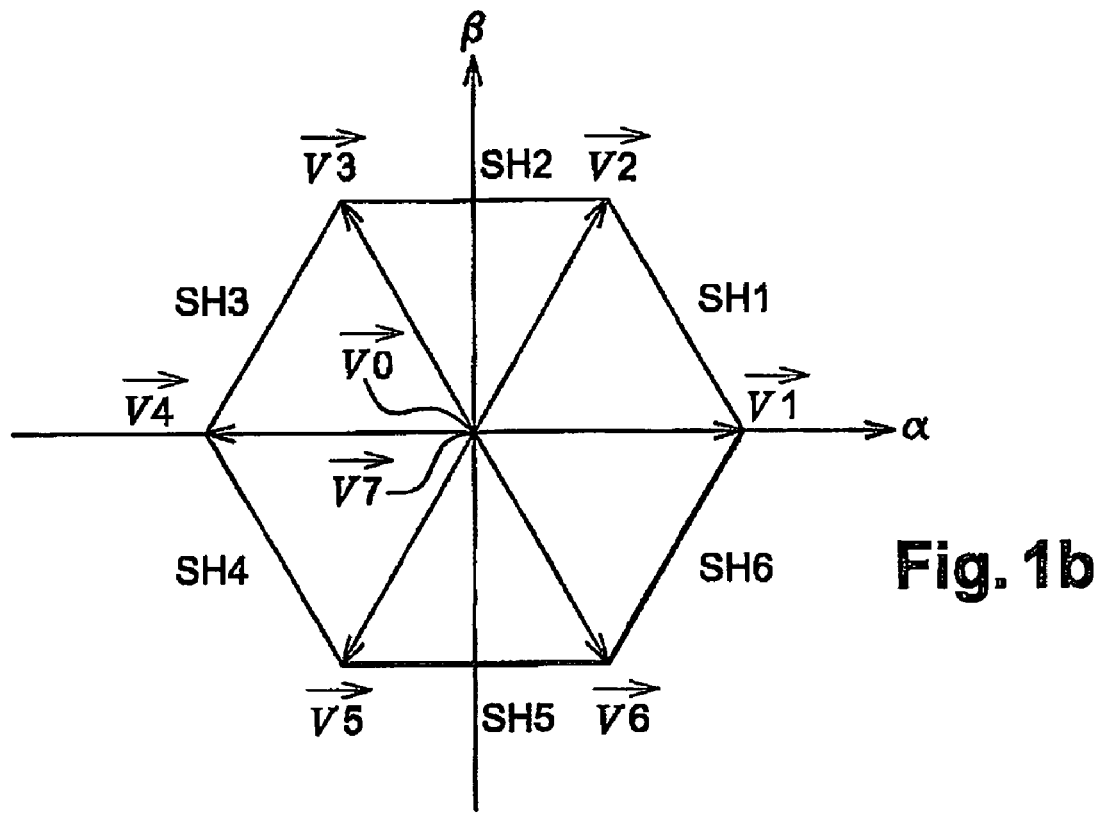
FIG. 1b: a representation of a stator reference frame used in the method of FIG. 1a, FIG. 1c: a representation of a decomposition of a set value vector in the stator reference frame of FIG. 1B, FIG. 2: an illustration of the steps of a first embodiment and a second non-limitative embodiment of the method according to the invention.

The control vectors produced by the control logic 4 can be represented by a stator reference frame illustrated in FIG. 1B. The stator reference frame is a reference frame with fixed axes (α, β) linked to the stator. The axis α is horizontal and the axis β is vertical. The axis α is at 90 degrees to the axis β. In a preferred example, the control vector $\vec{V1}$ is situated on the axis α. The ends of the active control vectors $\vec{V1}$ to $\vec{V6}$ form a hexagon. The centre of the hexagon is connected to each of its vertices by an active control vector. In a non-limitative embodiment, the active control vectors $\vec{V1}$ to $\vec{V6}$ are at 60 degrees from one another. Thus the hexagon is broken down into six active sectors SH, each active sector being formed by two adjacent active vectors and has its centre at the centre of the hexagon.

In one example, the first sector SH1 is represented by the control vectors $\vec{V1}$ and $\vec{V2}$ and so on as far as the sixth sector SH6, which is represented by the control vectors $\vec{V6}$ and $\vec{V1}$, each of the vectors comprising three switching functions SC in the example taken.

The freewheeling control vectors $\vec{V0}$ and $\vec{V7}$, having a zero amplitude, are situated at the intersection of the axis α and the axis β. The intersection of the axis α and the axis β is the centre of the stator reference frame, which is also the centre of the hexagon.

Thus, in one example, the switching functions SC of the said vectors are shown in the following table. There is a correspondence between the combinations of the switching functions SC and the associated control vectors.

| Vector | SC2 | SC2 | SC3 |
|---|---|---|---|
| $\vec{V0}$ | 0 | 0 | 0 |
| $\vec{V1}$ | 1 | 0 | 0 |
| $\vec{V2}$ | 1 | 1 | 0 |
| $\vec{V3}$ | 0 | 1 | 0 |
| $\vec{V4}$ | 0 | 1 | 1 |
| $\vec{V5}$ | 0 | 0 | 1 |
| $\vec{V6}$ | 1 | 0 | 1 |
| $\vec{V7}$ | 1 | 1 | 1 |

With "0" corresponding to a command to close the low switch of a bridge arm and to a command to open the high switch of the same bridge arm; and "1" corresponding to a command to open the low switch of a bridge arm and to a command to close the high switch of the same bridge arm. For example, if SC1=1, SC2=0 and SC3=0; the high switch INT11 of the first arm B1 is closed, the low switch INT12 of the first arm B1 is open, the high switch INT21 of the second arm B2 is open, the low switch INT22 of the second arm B2 is closed, and finally the high switch INT31 of the third arm B3 is open and the low switch INT32 of the third arm is closed.

The control logic 4 for controlling the switches of the inverter is often produced in the form of an integrated circuit. In one example, FIG. 1A, this control logic 4 comprises:
a microprocessor 8,
a program memory 9,
and an input/output interface 10, the microprocessor 8, the memory 9 and the input/output interface 10 being interconnected by a bus 11.

In practice, when attributing an action to a device, this is performed by a microprocessor of the device controlled by instruction codes recorded in a program memory of the device. The control logic 4 is such a device.

The program memory 9 is divided into several areas, each area corresponding to instruction codes for fulfilling a function of the device. The memory 9 thus comprises:

an area 12 containing instruction codes for implementing the acquisition of the voltage set values, an area 13 containing instruction codes for carrying out a calculation of the modulants according to the chosen strategy (intersective strategy or barycentric strategy), as will be seen in detail below, an area 14 containing instruction codes for determining a voltage vector set value $\vec{V^*}$ according to scalar voltage set values V1*, V2*, V3*, which are the voltages that it is wished to apply to the load 3, an area 15 containing instruction codes for producing an order relationship between the modulants, an area 16 containing instruction codes for carrying out a measurement and comparison of the phase currents of the load 3, an area 17 containing instruction codes for determining a quantity of neutral according to the result of the comparison of the phase currents of the load 3, an area 18 containing instruction codes for determining a carrier for generating pulses of variable width according to one or more modulants, an area 19 containing instruction codes for carrying out a comparison between the carrier and the translated modulants of the given quantity of neutral, an area 20 containing instruction codes for making an election of control vectors from this comparison, an area 21 containing instruction codes for applying the said control vectors to the inverter 1.

Figure 2:
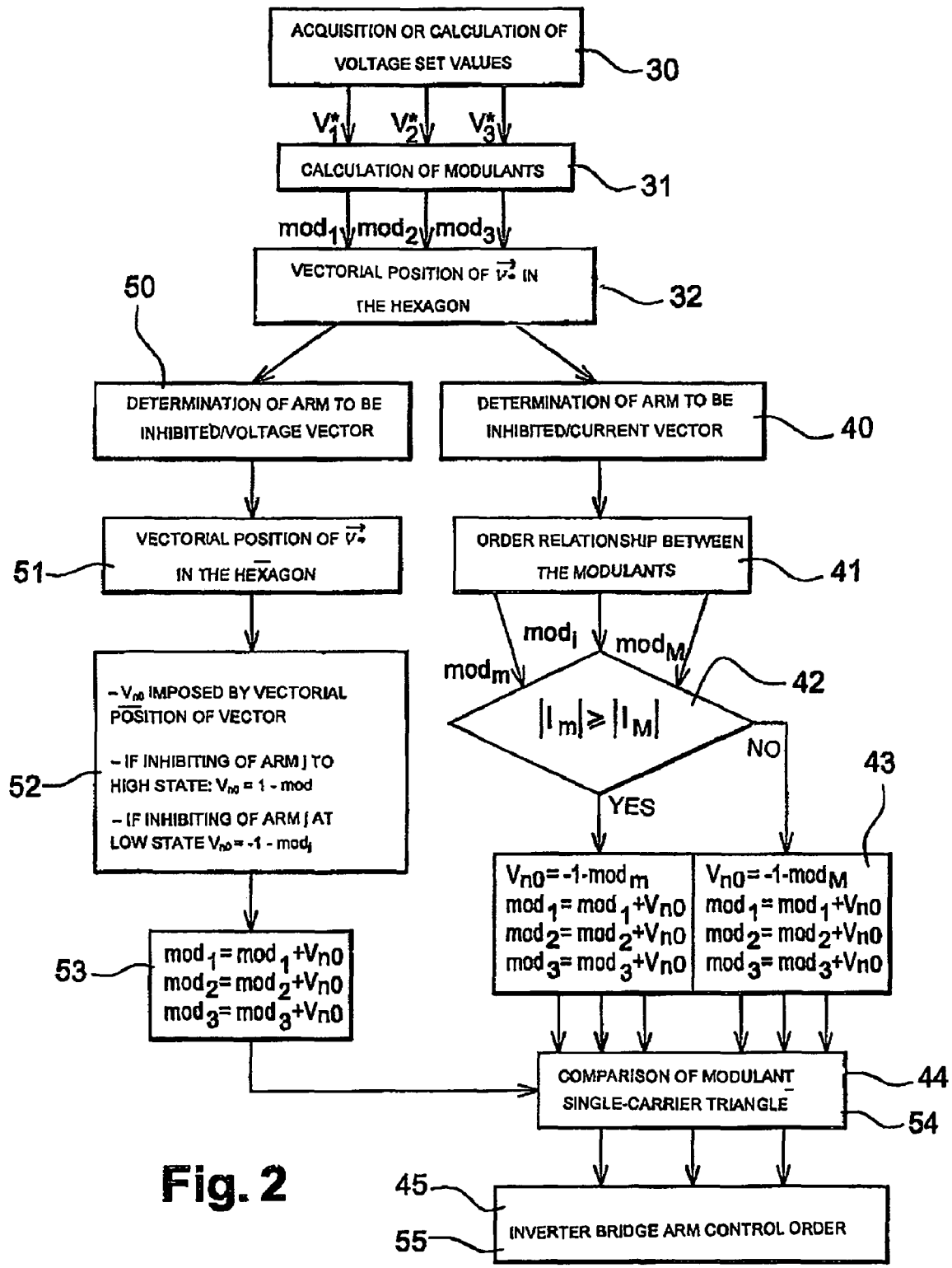

FIG. 2 shows the operating method of the means illustrated in FIG. 1A. Such a method makes it possible to choose, in a simplified manner, a succession of control vectors controlling the inverter 1 while reducing the switching losses in the latter.

In a first step 30), the control logic 4 acquires the three scalar voltage set values V1*, V2* and V3* of each of the three arms of the inverter 1. These three scalar voltage set values V1*, V2* and V3* are the voltages that it is wished to apply to the load 3. These three scalar voltage set values V1*, V2* and V3* can be measured or calculated by the control logic 4.

These set values can thus be calculated internally by the control logic (management for example of the phase current regulation loop of the load in the control logic). It is also possible to have a supervision control logic that supplies the set voltages to the control logic 4 by means of a serial, parallel or CAN link. It will then be necessary for the control logic 4 to measure the information supplied by the supervisor.

In a second step 31), the control logic 4 determines, for each bridge arm of the inverter 1, a corresponding modulant mod1, mod2, mod3. The control logic 4 can determine the modulants in several ways (non-limitative intersective strategy or barycentric strategy), as will be seen in detail below, the said modulants being a function of the scalar voltage set values. It will be noted that a modulant represents a standardised value with respect to the DC bus voltage of the scalar voltage set value of a bridge arm of the inverter. The modulant/triangle intersection will supply the MLI command orders of the bridge arm, as will be seen in detail below.

Intersective Strategy

In a first non-limitative embodiment, the control logic can calculate the modulants according to an intersective strategy. In this case, the control logic 4 measures or estimates the voltage of the DC bus $U_{DC}$, preferably close to the inverter 1, in order to obtain the actual voltage available at the terminals of the said inverter 1. The control logic 4 determines the modulant of each phase of the load 3. The modulant is associated with each bridge arm. This modulant is, in a non-limitative example, a standardised value of a scalar voltage set value with respect to the source voltage $U_{DC}$. Thus, for each of the three scalar voltage set values V1*, V2* and V3*, the control logic 4 determines respectively the three modulants mod1, mod2 and mod3.

Thus the standardisation is effected in the following manner:

$$\text{mod} = \frac{\text{Max} - \text{Min}}{U_{DC}} V^* + \text{Min}$$

Max being the highest value reached by a triangular carrier, which will be defined subsequently.

Min being the lowest value reached by the triangular carrier.

Which gives, with a value Min=−1 and Max=1:

$$\text{mod} = \frac{2 \cdot V_s^*}{U_{DC}} - 1$$

Thus, $$\text{mod}1 = \frac{2 \cdot V1^*}{U_{DC}} - 1$$

$$\text{mod}2 = \frac{2 \cdot V2^*}{U_{DC}} - 1$$

$$\text{mod}3 = \frac{2 \cdot V3^*}{U_{DC}} - 1$$

Thus, in this case, the voltage Vs applied at the output of a bridge arm is equal to the bridge arm command multiplied by the DC voltage $U_{DC}$.

Thus, for each of the three scalar voltage set values V1*, V2* and V3*, the control logic 4 determines respectively the three modulants mod1, mod2 and mod3.

Barycentric Strategy

In a second non-limitative embodiment, the control logic 4 can determine the modulants mod1, mod2 and mod3 according to a barycentric strategy. According to this strategy, two active vectors and the two freewheeling vectors are used over the control period of the inverter 1 in order to decompose the set voltage vector. To do this, the control logic first of all applies step 32 before determining the three modulants mod1, mod2 and mod3 at step 31.

It should be noted that the control period of the inverter represents the interval of time where an opening and closure of the high switch of the bridge arm will be demanded (control of the switch is complementary). A chopping period is also spoken of.

Firstly, the control logic 4 determines, from the three scalar voltage set values V1*, V2* and V3*, a set voltage vector $\vec{V^*}$.

The control logic 4 can determine the set voltage vector $\vec{V^*}$ according to a "Clarke" transformation known to persons skilled in the art.

In this case, the control logic 4 calculates the two components V*x and V*y forming the said voltage vector $\vec{V^*}$ according to the following formulae:

$$V^*x = \frac{2}{3}\left(V1^* - \frac{1}{2} \times V2^* - \frac{1}{2} \times V3^*\right)$$

and $$V^*y = \frac{2}{3}\left(\frac{1}{2}\sqrt{3} \times V2^* - \frac{1}{2}\sqrt{3} \times V3^*\right)$$

It should be noted that naturally other transformations can be used such as the "Concordia" transformation known to persons skilled in the art. It is differentiated by the standardisation factor.

At step 32, the control logic 4 determines the vectorial position of the set voltage vector $\vec{V^*}$ in the hexagon formed by the control vectors $\vec{V0}$ to $\vec{V7}$ and more particularly the position of the set voltage vector in one of the active sectors SH.

This set voltage vector $\vec{V^*}$ is at any time situated in one of the six active sectors SH of the hexagon.

Thus, in order to determine its position, the phase of the set voltage vector that is equal to a tan(V*y/V*x) is calculated. Next this value is compared with the phase of the active voltage vectors. For example, if 0<the phase of the set voltage vector<60° then the set voltage vector is situated in the first sector.

Figure 1C:
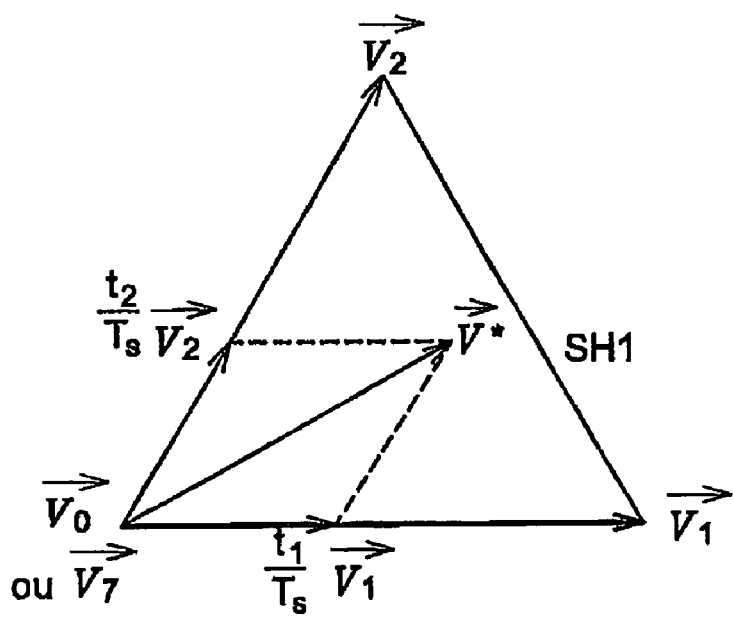

Next the set voltage sector $\vec{V^*}$ is decomposed on the two adjacent active control vectors making up the active sector SH in which it is situated, as illustrated in FIG. 1C.

In one example, the set voltage vector $\vec{V^*}$ is decomposed on the two adjacent active control vectors $\vec{V1}$ and $\vec{V2}$ making up the active sector SH1 in which it is situated, illustrated in FIG. 1c.

This decomposition makes it possible to determine the coefficients ti and tj such that:

$$\vec{V}^* = \left(\frac{ti}{Ts} \times \vec{V}i\right) + \left(\frac{tj}{Ts} \times \vec{V}j\right)$$

where Ts is the period according to which the inverter is controlled. And ti and tj corresponds to the times of application of the adjacent active control vectors $\vec{Vi}$ and $\vec{Vj}$ over the period Ts, the said active control vectors defining the active sector SH in which the set voltage vector $\vec{V^*}$ is situated, as seen previously. The active sector SHN is defined by the adjacent active control vectors $\vec{V}$ N and $\vec{V}$ N+1, i=1 to 5, and the active sector SH6 is defined by the adjacent active control vectors $\vec{V6}$ and $\vec{V2}$.

Once the application times ti and tj are known, ie after the decomposition of the set voltage vector $\vec{V^*}$ in the active sector of the hexagon in which it is situated, the control logic 4 determines the three modulants mod1, mod2 and mod3 for the active sector SH concerned according to the application times of the control vectors and the control period of the inverter 1 by means of the following table:

|        | Sector SH1                              | Sector SH2                           | Sector SH3                           |
|--------|-----------------------------------------|--------------------------------------|--------------------------------------|
| mod1   | (Max − Min)/Ts * (t1 + t2 + t0/2) + Min | (Max − Min)/Ts * (t2 + t0/2) + Min   | (Max − Min)/Ts * (t0/2) + Min        |
| mod2   | (Max − Min)/Ts * (t2 + t0/2) + Min      | (Max − Min)Ts * (t3 + t2 + t0/2) + Min | (Max − Min)/Ts * (t3 + t4 + t0/2) + Min |
| mod3   | (Max − Min)/Ts * (t0/2) + Min           | (Max − Min)/Ts * (t0/2) + Min        | (Max − Min)/Ts * (t4 + t0/2) + Min   |

|        | Sector 4                                | Sector 5                             | Sector 6                             |
|--------|-----------------------------------------|--------------------------------------|--------------------------------------|
| mod1   | (Max − Min)/Ts * (t0/2) + Min           | (Max − Min/Ts * (t6 + t0/2) + Min    | (Max − Min)Ts * (t1 + t6 + t0/2) + Min |
| mod2   | (Max − Min)/Ts * (t4 + t0/2) + Min      | (Max − Min)/Ts * (t0/2) + Min        | (Max − Min)/Ts * (t0/2) + Min        |
| mod3   | (Max − Min)Ts * (t5 + t4 + t0/2) + Min  | (Max − Min/Ts * (t5 = t6 = t0/2) + Min | (Max − Min)/Ts * (t6 + t0/2) + Min   |

The following table applies for Min=−1 and Max=1.

|        | Sector SH1              | Sector SH2                   | Sector SH3                   |
|--------|-------------------------|------------------------------|------------------------------|
| mod1   | 2/Ts * (t1 + t2 + t0/2) − 1 | 2/Ts * (t2 + t0/2) − 1    | 2/Ts * (t0/2) − 1            |
| mod2   | 2/Ts * (t2 + t0/2) − 1  | 2/Ts * (t3 + t2 + t0/2) − 1  | 2/Ts * (t3 + t4 + t0/2) − 1  |
| mod3   | 2/Ts * (t0/2) − 1       | 2/Ts * (t0/2) − 1            | 2/Ts * (t4 + t0/2) − 1       |

|        | Sector SH4              | Sector SH5                   | Sector SH6                   |
|--------|-------------------------|------------------------------|------------------------------|
| mod1   | 2/Ts * (t0/2) − 1       | 2/Ts * (t6 + 0/2) − 1        | 2/Ts * (t1 + t6 + t0/2) − 1  |
| mod2   | 2/Ts * (t4 + t0/2) − 1  | 2/Ts * (t0/2) − 1            | 2/Ts * (t0/2) − 1            |
| mod3   | 2/Ts * (t5 + t4 = t0/2) − 1 | 2/Ts * (t5 + t6 = t0/2) − 1 | 2/Ts * (t6 + t0/2) − 1       |

The time t0 represents the application times for the free-wheeling vectors $\vec{V0}$ and $\vec{V7}$. The application time t0 is determined according to the active sector SH in which the set voltage vector $\vec{V^*}$ is situated. When the set voltage vector $\vec{V^*}$ is situated in the first active sector SH1 then t0=Ts−t1−t2. When it is in the second active sector SH2 then t0=Ts−t2−t3. And so on up to the sixth active sector SH6, where t0=Ts−t6−t1.

Naturally other strategies can be used in calculating modulants.

After having determined the modulants of each bridge arm according to an intersective or barycentric strategy, as described above, a bridge arm to be inhibited is determined, non-limitatively, either with respect to a current vector $\vec{i}$ or with respect to the position of a voltage vector $\vec{V2}$, as will be seen below.

Determination of the Inhibited Arm with Respect to the Position of the Current Vector $\vec{i}$ In a first embodiment, the bridge arm to be inhibited with respect to the phase currents is determined. In this case, in order to determine the bridge arm to be inhibited, the control logic 4 applies steps 40 to 45. Inhibiting a bridge arm means keeping the said bridge arm in a given state. In other words, the states of the switches of the said bridge arm remain unchanged. There is no switching of the arm.

At step 40, the control logic determines the bridge arm to be inhibited with respect to the current vector $\vec{i}$. The inhibiting of a bridge arm will make it possible to reduce the switching losses in the switches.

To this end, at step 41, in a first, non-limitative variant embodiment, the control logic 4 first selects two bridge arms among the three, able to be inhibited according to an order relationship between the three modulants mod1, mod2, mod3 of the three bridge arms, this order relationship being, in a non-limitative example, a comparison. Thus the two bridge arms selected are the bridge arms having the highest modulant $mod_M$ and the bridge arm having the lowest modulant $mod_m$ according to the comparison of the three modulants, the bridge arm corresponding to the intermediate modulant not being able to be inhibited without inhibiting another arm and thus making it possible to generate on average the set voltage vector $\vec{V^*}$ since only one active control vector and one free-wheeling vector would be available.

In a second non-limitative variant embodiment, the control logic 4 selects the two bridge arms able to be inhibited according to a comparison between the three scalar voltage set values V1*, V2* and V3* since, whenever the method of calculating the modulants (here intersective or barycentric), the order relationship between the three modulants is the same as between the three scalar voltage set values because of the relationship that exists between a modulant and the corresponding scalar voltage set value. The two bridge arms selected are the bridge arms having the highest scalar voltage set value and the bridge arm having the lowest scalar voltage set value.

For the remainder of the steps, the context of the first variant is adopted.

The control logic 4 at step 42 chooses the bridge arm to be inhibited from the two arms selected previously. It determines firstly the phase current $I_M$, for the bridge arm having the highest modulant $mod_M$, and secondly the phase current $I_m$, for the bridge arm having the lowest modulant $mod_m$. To determine the bridge arm that will be inhibited, the control logic 4 compares the absolute values of these phase currents $I_M$ and $I_m$. It inhibits the bridge arm where the absolute value of the phase current is the highest in absolute value. If that corresponds to the bridge arm having the highest modulant mod$_M$, then the arm is inhibited at the high state. If this corresponds to the bridge arm having the lowest modulant mod$_m$, then the arm is inhibited at the low state.

At step 43, the control logic 4 determines a quantity of neutral V$_{n0}$ to be injected in the modulants mod1, mod2 and mod3, according to the result of the comparison.

In the case where the absolute value of the phase current I$_m$ of the smallest modulant mod$_m$ is higher than the absolute value of the phase current I$_M$ of the largest modulant mod$_M$, then the control logic 4 determines a quantity of neutral V$_{n0}$ that is equal to a second minimum value Min minus the smallest modulant mod$_m$. The quantity of neutral V$_{n0}$=Min−mod$_m$. In the non-limitative example taken, the second minimum value Min is equal to −1.

In the contrary case, the control logic 4 determines a quantity of neutral V$_{n0}$ that is equal to a first maximum value Max minus the largest modulant mod$_M$. A quantity of neutral V$_{n0}$=Max−mod$_m$. In the non-limitative example taken, the first maximum value Max is equal to +1.

The modulants mod1, mod2 and mod3 are translated by adding this neutral quantity V$_{n0}$, determined so as to inhibit an arm.

In addition, according to a first non-limitative variant, if the absolute value of the phase current |I$_m$| of the smallest modulant mod$_m$ is equal to the absolute value of the phase current |I$_M$| of the largest modulant mod$_M$ then the quantity of neutral V$_{n0}$ is equal to −1-mod$_m$. FIG. 2 illustrates this first variant.

According to a second variant, if the absolute value of the phase current |I$_m$| of the smallest module mod$_m$ is equal to the absolute value of the phase current |I$_M$| of the largest modulant mod$_M$ then the quantity of neutral V$_{n0}$ is equal to 1−mod$_M$.

At step 44, the control logic 4 determines at least one simple carrier 40. This simple carrier 40 is a signal whose period is the chopping period. The control logic 4 can also determine as many simple carriers as there exist bridge arms. In this case, each modulant of a bridge arm is compared with the corresponding carrier. These carriers can be different from one another.

In the example in FIG. 2, the control logic 4 determines a single simple carrier for the three bridge arms. This carrier 40 is a triangle so as to comply with linearity between a modulant and the mean value of the pulse generated on the corresponding arm over the control period Ts of the inverter 1. In the example taken at FIG. 4, this triangle is taken between a first maximum value Max, here equal to 1, and a second minimum value Min here equal to −1 respectively for the vertex and the base. In a non-limitative embodiment, this simple carrier 40 is an isosceles triangle. In addition, preferentially, the vertex points upwards, ie the vertex is situated at the first maximum value Max=+1, and the base is situated at the second minimum value Min=−1.

In another embodiment, this simple carrier 40 can be any triangle making it possible to modify, except for the width of the pulses, the position of the said pulses in the chopping period or the polarity of said pulses (vertex pointing downwards).

In another embodiment, the carrier 40 can also be a succession of triangles whose period is the chopping period Ts of the inverter 1.

This carrier 40 can also be a triangle whose vertex points downwards, ie the vertex is situated at the second minimum value Min=−1, and the base is situated at the first maximum value Max=+1.

It should be noted that the chopping period Ts is not necessarily constant when the inverter is used so as to spread the spectrum of the output voltages of the inverter 1, and thereby also the period of the carrier. This spectrum spreading modifies the acoustic noise generated by the polyphase load 3.

As will be described in FIG. 4 (for more details, see the paragraph for comparison with a simple carrier described below), the control logic 4 compares the carrier 40 with the three translated modulants of the quantity of neutral V$_{n0}$. According to this comparison, the control logic 4 determines, at step 45, the orders of commands SC for each of the three bridge arms of the inverter 1 (more particularly the combinations of the command orders determining a succession of control vectors) so as to generate on average the set voltage vector $\overrightarrow{V^*}$ to be applied to the load 3 by the said inverter 1 in order to control the said load.

These command orders are switching functions SC for the switches of the bridge arms.

Thus this technique of movement of the quantity of neutral $\overrightarrow{V^*}$ reduces the stresses on the inverter 1 in terms of losses, by making a simple intersection between the new translated modulants. This reduction in the stresses on the inverter 1 limits the switching losses. This is because this technique makes it possible to inhibit a bridge arm.

The control logic 4 applies to the inverter 1 the command orders determined at step 45.

Determination of the Inhibited Arm with Respect to the Position of the Set Voltage Vector $\overrightarrow{V^*}$ In a second embodiment, the bridge arm to be inhibited is determined with respect to the set voltage vector $\overrightarrow{V^*}$ and more particularly the sectorial position of the set voltage vector in one of the angular sectors SA of the stator reference frame. In this case, to determine the bridge arm to be inhibited, the control logic 4 applies steps 50 to 55.

Figure 3:
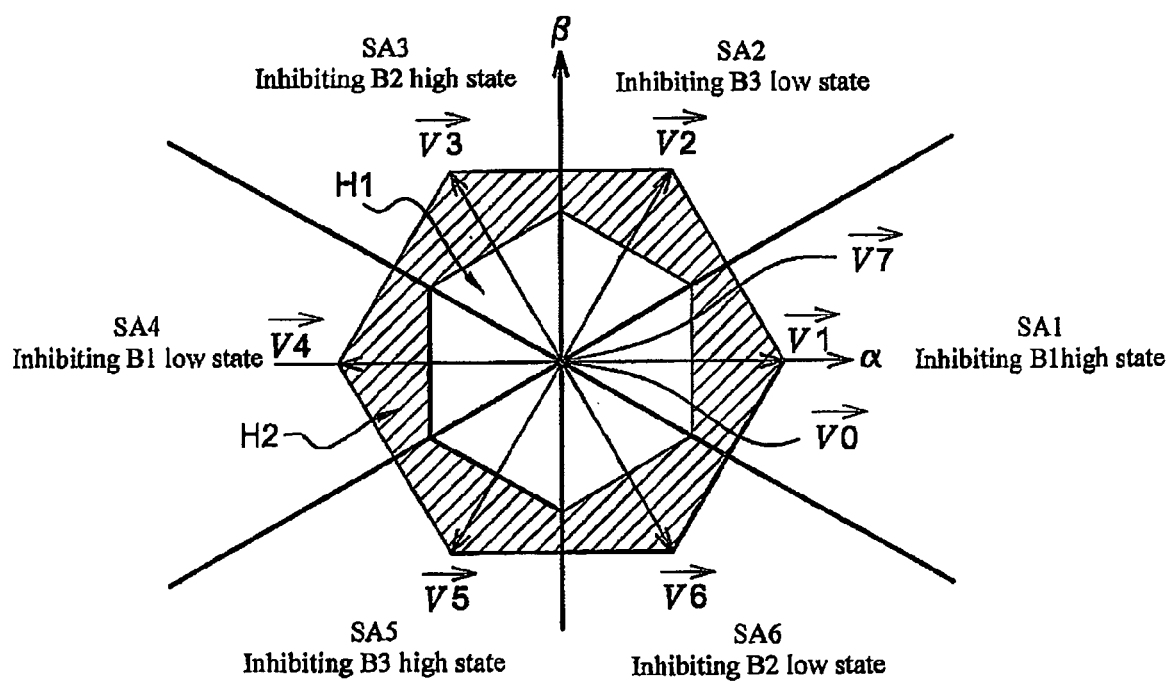
FIG. 3: a representation of a stator reference frame used in the second embodiment in FIG. 2, FIG. 4: an illustration of one of the steps of the method of FIG. 2 corresponding to a comparison between a carrier and the modulants of each of the bridge arms of the inverter.

In this case, the stator reference frame is subdivided into angular sectors SA illustrated in FIG. 3. Each angular sector has its vertex at the centre of the stator reference frame and forms an angle of 60°. Each of the active control vectors cuts each of the angular sectors into two equal parts. The stator reference frame comprises six angular sectors SA. The first angular sector SA1 is cut into two equal parts by the control vector $\overrightarrow{V1}$ and so on up to the sixth angular sector SA6, which is cut by the control vector $\overrightarrow{V6}$.

At step 50, the control logic 4 determines the bridge arm to be inhibited with respect to the set voltage vector $\overrightarrow{V^*}$. At step 51, the control logic 4 determines the sectorial position of the set voltage vector $\overrightarrow{V^*}$ in the angular sectors of the stator reference frame. The sectorial position of the set voltage vector $\overrightarrow{V^*}$ in the stator reference frame determines the high state or the low state of the bridge arm to be inhibited.

It should be noted that inhibiting a bridge arm means keeping the said bridge arm in a given state. In other words, the states of the switches of the said bridge arm remain unchanged. There is no switching of the arm.

The high state or the low state of a bridge arm defines which of the two switches of the said bridge arm is conducting. This high state and this low state are in general defined for convenience. In a non-limitative embodiment, the high state is defined when the switches situated at the top of each bridge arm of the inverter are closed. And the low state is defined when these same switches are open. Knowing the state of one of the two switches of a bridge arm automatically gives information on the state of the other switch of the said bridge arm since their functioning is here complementary. The bridge arm to be inhibited depends on the sectorial position of the set voltage vector $\vec{V^*}$ in the angular sectors SA of the stator reference frame as follows:

If the set voltage vector $\vec{V^*}$ is in the first angular sector SA1 then the first arm B1 is inhibited at the high state, If the set voltage vector $\vec{V^*}$ is in the second angular sector SA2 then the third arm B3 is inhibited at the low state, If the set voltage vector $\vec{V^*}$ is in the third angular sector SA3 then the second arm B2 is inhibited at the high state, if the set voltage vector $\vec{V^*}$ is in the fourth angular sector the first arm B1 is inhibited at the low state, If the set voltage vector $\vec{V^*}$ is in the fifth angular sector SA5 then the third arm B3 is inhibited at the high state, If the set voltage vector $\vec{V^*}$ is in the sixth angular sector SA6 then the second arm B2 is inhibited at the low state.

At step 52, the control logic 4 determines a quantity of neutral $V_{n0}$ to be injected at the modulants mod1, mod2 and mod3, according to the position of the set voltage vector $\vec{V^*}$ in the angular sectors SA of the stator reference frame.

When the bridge arm Bj is to be inhibited at the high state then the control logic determines a quantity of neutral $V_{n0}$=Max−modj. When the bridge arm Bj is to be inhibited at the low state then the control logic determines a quantity of neutral $V_{n0}$=Min−modj. In our example, Max=+1 and Min=−1.

At step 53, the control logic 4 translates the modulants mod1, mod2 and mod3 of this given quantity of neutral $V_{n0}$. This translation is an addition of the quantity of neutral $V_{n0}$ to the modulants mod1, mod2 and mod3.

Thus, for example, if the first arm B1 is to be inhibited at the high state, then the quantity of neutral $V_{n0}$ to be added to the three modulants mod1, mod2 and mod3 is equal to 1−mod1. In this way the value+1 is obtained for mod1, the value mod2+1−mod1 for mod2, and the value mod3+1−mod1 for mod3.

At step 54, the control logic 4 determines at least one carrier 40. This carrier is a simple carrier.

It has the same characteristics as that described in the previous paragraph "Determination of the inhibited arm with respect to the position of the current vector $\vec{1}$".

As will be described in FIG. 4 (for more details see the paragraph on the comparison with a simple carrier described below), the control logic 4 compares the carrier with the three translated modulants of the quantity of neutral $V_{n0}$.

According to this comparison, the control logic 4 determines, at step 55, the control orders for each of the three bridge arms of the inverter 1 (more particularly the combinations of the control orders determining a succession of control vectors) so as to generate on average the set voltage vector $\vec{V^*}$ to be applied to the load 3 by the said inverter 1 in order to control the said load.

These control orders are switching functions SC of the switches of the bridge arms.

The control logic 4 applies to the inverter 1 this succession of control vectors corresponding to the control orders generated, determined at step 55.

Thus this technique of movement of the quantity of neutral $V_{n0}$ makes it possible to reduce the stresses on the inverter 1 in terms of losses, by making a simple intersection between the new translated modulants. This reduction in the stresses on the inverter 1 limits the switching losses. This is because this technique makes it possible to inhibit a bridge arm.

Comparison with a Simple Carrier

This paragraph describes in detail the use of a simple carrier for determining the control orders to be sent to the bridge arms of the inverter. This simple carrier is a signal whose period is the chopping period. The control logic 4 can also determine as many simple carriers as there are bridge arms. In this case, each modulant of a bridge arm is compared with the corresponding simple carrier. These simple carriers can be different from one another.

Figure 4:
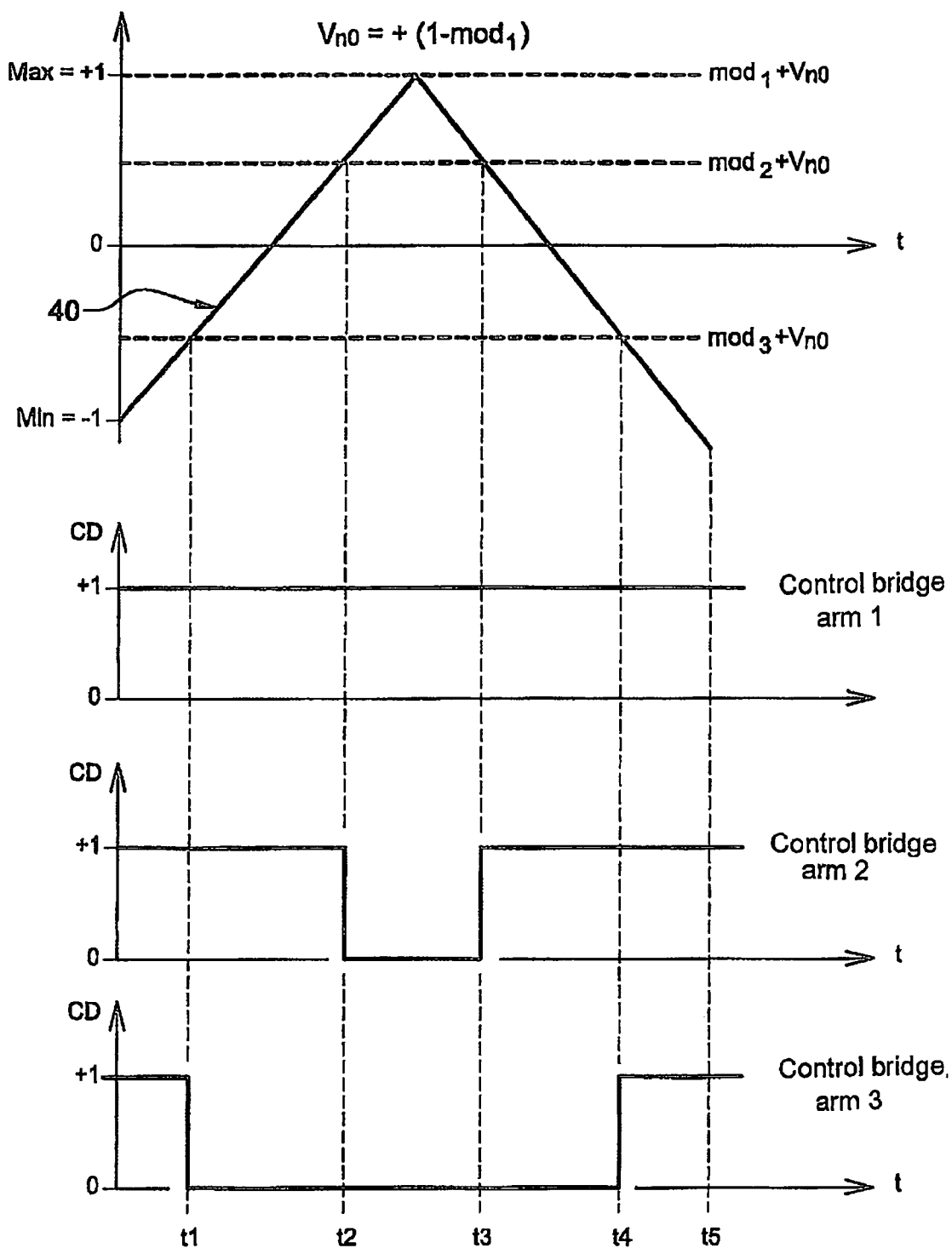

In the example in FIG. 4, the control logic 4 determines a single simple carrier for the three bridge arms. This simple carrier 40 is a triangle so as to comply with linearity between a modulant and the mean value of the pulse generated on the corresponding arm over the control period Ts of the inverter 1. In the example taken in FIG. 4, this triangle is taken between a first maximum value Max, here equal to 1, and a second minimum value Min, here equal to −1 respectively for the vertex and base. In a non-limitative embodiment, this simple carrier 40 is an isosceles triangle. In addition, non-limitatively, the vertex points upwards, ie the vertex is situated at the first maximum value Max=+1 and the base is situated at the second minimum value Min=−1.

In another embodiment, this carrier 4 can be any triangle making it possible to modify, except for the width of the pulse, the position of the said pulses in the chopping period or the polarity of the said pulses (vertex pointing downwards).

In another embodiment, the carrier 40 can also be a succession of triangles whose period is the chopping period Ts of the inverter 1.

This carrier 40 can also be a triangle whose vertex points downwards, ie the vertex is situated at the second minimum value Min=−1, and the base is situated at the first maximum value Max=+1.

It should be noted that the chopping period Ts is not necessarily constant when the inverter is used so as to spread the spectrum of the output voltages of the inverter 1, and thereby also the period of the carrier. This spectrum spreading modifies the acoustic noise generated by the polyphase load 3.

FIG. 4 shows the comparison between the simple carrier 40 and the three translated modulants mod1, mod2 and mod3 of the quantity of neutral $V_{n0}$.

In FIG. 4, the first timing diagram has axes where the X axis represents the time and the Y axis the standardised voltage values, and the other three timing diagrams have axes where the X axis represents the time and the Y axis the switching functions SC of each of the three bridge arms respectively.

In the example in FIG. 4, the modulant mod1 is calculated for the bridge arm B1, the modulant mod2 is calculated for the bridge arm B2 and the modulant mod3 is calculated for the bridge arm B3.

The modulant mod3 is, in the example in FIG. 4, the lowest modulant among the three modulants and the modulant mod1 is the largest. The largest of the modulants $mod_M$ is equal to the modulant mod1. In this case the control logic 4 inhibits the bridge arm B1 since the current I1 is higher than the current I3 in absolute value. Because of this, the quantity of neutral to be added to the three modulants is $V_{n0}$=1−mod1. The bridge arm B1 inhibited at the high state has its translated modulant equaling+1.

The bridge arm B1 inhibited at the high state has at the intersection with the triangular carrier 40 not an interval of time (at the vertex of the carrier, at the intersection of the triangular carrier and the modulant mod1+$V_{n0}$), but rather at an intersection at one point, as shown in FIG. 4. The bridge arm 4 therefore does not change state.

The comparison between the carrier 40 and the translated modulants makes it possible to define the succession of control orders SC to be applied to the inverter. Thus the intersection with the translated modulants and the carrier 40 determines a command of the pulse type (rising edge: high switch closes, low switch opens; and falling edge: high switch opens and low switch closes) on each of the bridge arms B2 and B3 to be switched. Because of this the control logic 4 controls the inverter by a succession of control vectors.

According to the decomposition of the set voltage vector in a sector of the hexagon, the control logic 4 chooses the appropriate freewheeling vector. In the example in FIG. 4, the freewheeling vector chosen is the vector V7.

Thus, at time t0, the bridge arm B1 is inhibited at the high state, its translated modulant of the quantity of neutral $V_{n0}$ has a horizontal straight line at +1. At this time t0, the translated modulants of the bridge arms B2 and B3 are situated outside the carrier 40, ie do not have any intersection with the said carrier and are situated outside the surface of the triangle formed by the carrier. The switches of these two bridge arms are at the high state. In this interval, the corresponding switching functions are equal to +1. These two arms therefore remain at the high state. They therefore do not change state.

At time t1, the modulant mod3+$V_{n0}$ comes into contact with one of the sides of the carrier 40. The control logic 4 sends to the bridge arm B3 a control order SC. This control order switches the bridge arm B3. The bridge arm B3 changes state and therefore passes to the low state.

At time t2, the modulant mod2+$V_{n0}$ comes into contact with one of the sides of the carrier 40. The control logic 4 sends to the bridge arm B2 a control order SC. This control order switches the bridge arm B2. The bridge arm B2 therefore changes state and goes to the low state.

In the interval t2 to t3, the modulant mod2+$V_{n0}$ is situated in the triangle of the carrier 40, ie does not have any intersection with the said carrier and is situated inside the surface of the triangle formed by the carrier. Throughout this period the bridge arm B2 remains at the low state.

At time t3, the modulant mod2+$V_{n0}$ once again comes into contact with another of the sides of the carrier 40. As from this time, the control logic 4 sends to the bridge arm B2 a control order SC. This control order switches the bridge arm B2 to the high state.

In the interval t1 to t4 the modulant mod3+$V_{n0}$ is situated in the triangle of the carrier 40. Throughout this period the bridge arm B2 remains at the low state.

At time t4, the modulant mod3+$V_{n0}$ once again comes into contact with another of the sides of the carrier 40. As from this time, the control logic 4 sends to the bridge arm B3 a control order SC. This control order switches the bridge arm B3 to the high state.

It should be noted that the establishment of the control orders SC by the method of intersection between a modulant and a triangular character means that the control orders SC of the inverter are of the two-state type. Moreover, according to the value of the modulant, the width of the resulting pulses is variable. There is therefore a pulse width modulation and therefore a control of the inverter by MLI. This is what was seen in FIG. 4.

Finally, the method of the invention described functions both in permanent mode and in dynamic mode. This is because this functions in dynamic mode since no attention is paid to the change over time of the phase currents. They are looked at just at one moment. The functioning is therefore here discrete.

The invention claimed is:

1. Method of controlling a power bridge (1) intended to control an electrical load (3) comprising several phases, the power bridge (1) being intended to be connected to the electrical load (3) via several arms (B1, . . . , B3), at least one per phase, and being intended to be controlled by switching functions (SC1, SC2, SC3), the said switching functions determining control vectors ($\vec{V0}, \ldots, \vec{V7}$) for controlling the load, the said control vectors ($\vec{V0}, \ldots, \vec{V7}$) being subdivided into freewheeling control vectors ($\vec{V0}, \vec{V7}$), and active control vectors ($\vec{V1}, \ldots, \vec{V6}$), the said method comprising the application of a method of producing switching functions that produces a reduced number of combinations of switching functions corresponding to freewheeling control vectors ($\vec{V0}, \vec{V7}$) in order to produce a succession of control vectors, characterised in that said method of producing switching functions comprises a step of selecting at least two bridge arms able to be inhibited according to an order relationship and a step of inhibiting, throughout the chopping period (Ts) of the power bridge (1), one of the said at least two bridge arms able to be inhibited.

2. Method of controlling a power bridge (1) according to claim 1, characterised in that the method of producing switching functions comprises a step of determining a modulant (mod1, mod2, mod3) associated with each arm of the bridge (B1, B2, B3) from scalar voltage set values (V1*, V2*, V3*).

3. Method of controlling a power bridge (1) according to claim 2, characterised in that a modulant is determined according to an intersective strategy.

4. Method of controlling a power bridge (1) according to claim 2, characterised in that a modulant is determined according to a barycentric strategy.

5. Method of controlling a power bridge (1) according to claim 2, characterised in that the order relationship is a comparison between the modulants (mod1, mod2, mod3) associated with the bridge arms (B1, B2, B3).

6. Method of controlling a power bridge (1) according to claim 2, characterised in that the bridge arms selected correspond to the bridge arms having the highest modulant ($mod_M$) and the lowest modulant ($mod_m$).

7. Method of controlling a power bridge (1) according to claim 2, characterised in that the bridge arm to be inhibited is chosen from the bridge arms selected and is the one that comprises a highest phase current ($I_M$, $I_m$) in absolute value among the phase currents corresponding respectively to a largest of the modulants ($mod_M$) and a smallest of the modulants ($mod_m$) among the modulants (mod1, mod2, mod3) associated with the bridge arms (B1, B2, B3).

8. Method of controlling a power bridge (1) according to claim 7, characterised in that, if the bridge arm to be inhibited is the one corresponding to the largest of the modulants, then the bridge arm is inhibited at the high state, and if the bridge arm to be inhibited is the once corresponding to the smallest of the modulants then the bridge arm is inhibited at the low state.

9. Method of controlling a power bridge (1) according to claim 2, characterised in that the method of producing switching functions also comprises a step of determining a quantity of neutral ($V_{n0}$) to be added to a modulant according to a high or low state of a bridge arm to be inhibited.

10. Method of controlling a power bridge (1) according to claim 9, characterised in that:

if an arm (Bj) is to be inhibited at the high state then the quantity of neutral ($V_{n0}$) is equal to a first maximum value (Max) minus the modulant associated with the said arm ($V_{n0}$=Max−$mod_j$), and if the arm (Bj) is to be inhibited at the low state then the quantity of neutral ($V_{n0}$) is equal to a second minimum value (Min) minus the modulant associated with the said arm ($V_{n0}$=Min−$mod_j$).

11. Method of controlling a power bridge (1) according to claim 2, characterised in that the method of producing switching functions comprises a step of comparing translated modulants of a quantity of neutral with a simple carrier, a modulant being associated with each bridge arm, the said comparison defining switching functions (SC) for controlling the said bridge.

12. Method according to claim 11, characterised in that the simple carrier is an isosceles triangle comprising a vertex situated at a maximum value (Max) and a base situated at a minimum value (Min).

13. Method of controlling a power bridge (1) according to claim 2, characterised in that the step of inhibiting a bridge arm depends on the position of a set voltage vector ($\vec{V^*}$) in a domain of the plane determined by control vectors ($\vec{V0}, \ldots, \vec{V7}$) the set voltage vector ($\vec{V^*}$) being determined from scalar voltage set values (V1*, V2*, V3*).

14. Method of controlling a power bridge (1) according to claim 13, characterised in that the domain of the plane is defined in a stator reference frame, the said stator reference frame being subdivided into angular sectors (SA) and in that the step of inhibiting a bridge arm in a high state or a low state depends on the position of the set voltage vector ($\vec{V^*}$) in one of the angular sectors (SA).

15. Method according to claim 14, characterised in that:

if the set voltage vector ($\vec{V^*}$) is in a first angular sector (SA1) then the first arm (B1) is inhibited at the high state, if the set voltage vector ($\vec{V^*}$) is in a second angular sector (SA2) then the third arm (B3) is inhibited at the low state, if the set voltage vector ($\vec{V^*}$) is in a third angular sector (SA3) then the second arm (B2) is inhibited at the high state, if the set voltage vector ($\vec{V^*}$) is in a fourth angular sector (SA4) then the first arm (B1) is inhibited at the low state, if the set voltage vector ($\vec{V^*}$) is in a fifth angular sector (SA5) then the third arm (B3) is inhibited at the high state, if the set voltage vector ($\vec{V^*}$) is in a sixth angular sector (SA6) then the second arm (B2) is inhibited at the low state.

16. Method of controlling a power bridge (1) according to claim 1, characterised in that the step of inhibiting a bridge arm depends on a current vector ($\vec{V^*}$).

17. Device for controlling a power bridge intended to be connected to an electrical load (3) via a bus (2) for implementing the said method according to claim 1, characterised in that it comprises a control logic (4), the power bridge being intended to be connected to a control logic (4), the control logic (4) implementing the said method.

18. Rotary electrical machine comprising:
a polyphase electrical load (3),
a voltage source (5),
a power bridge intended to be connected downstream to the electrical load (3) via a bus (2) and upstream to the voltage source (5),
a decoupling capacitor (7) being disposed in parallel to the bus (2), and
a device controlling the power bridge according to claim 17.

* * * * *